UNITED STATES PATENT OFFICE.

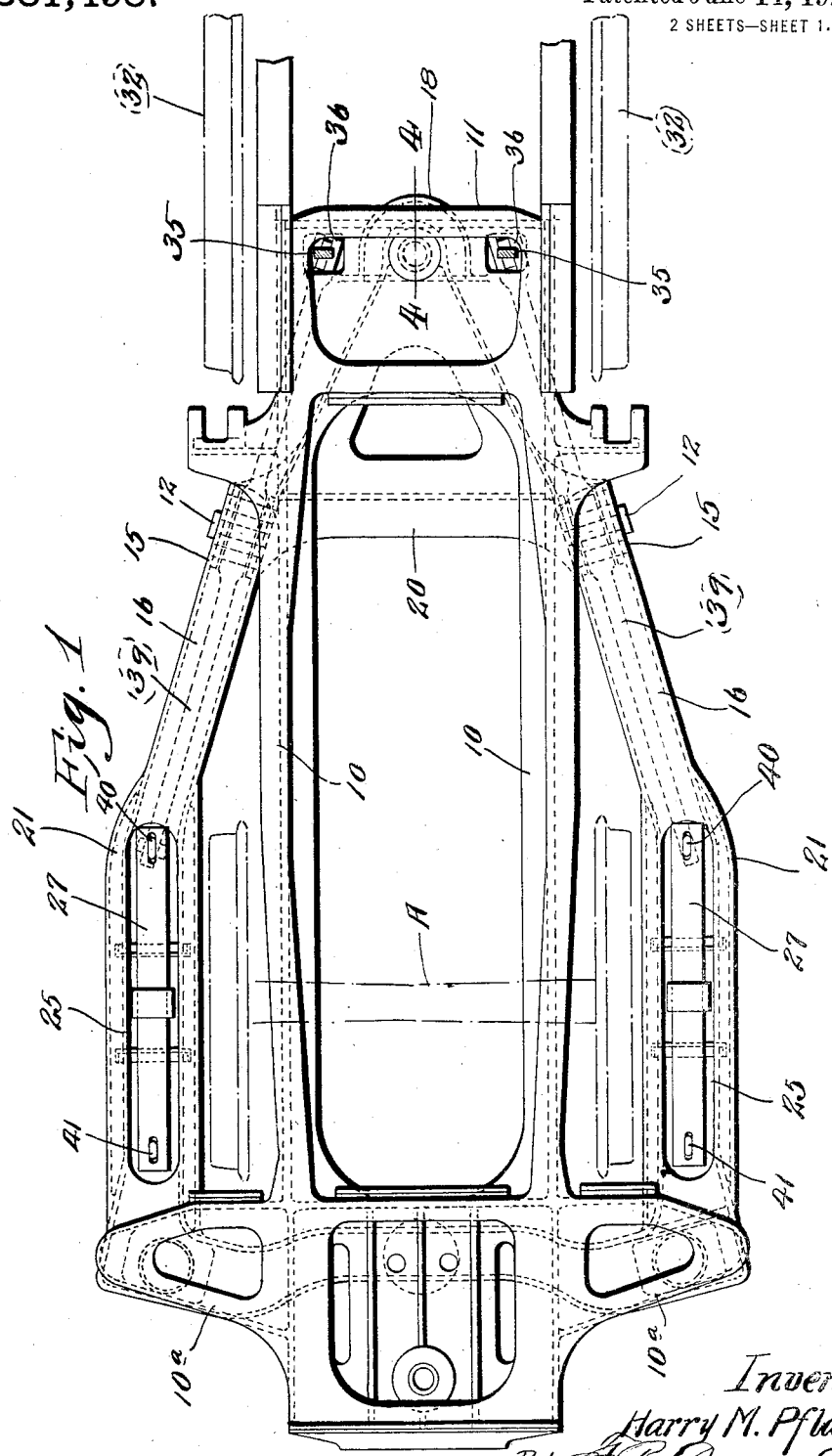

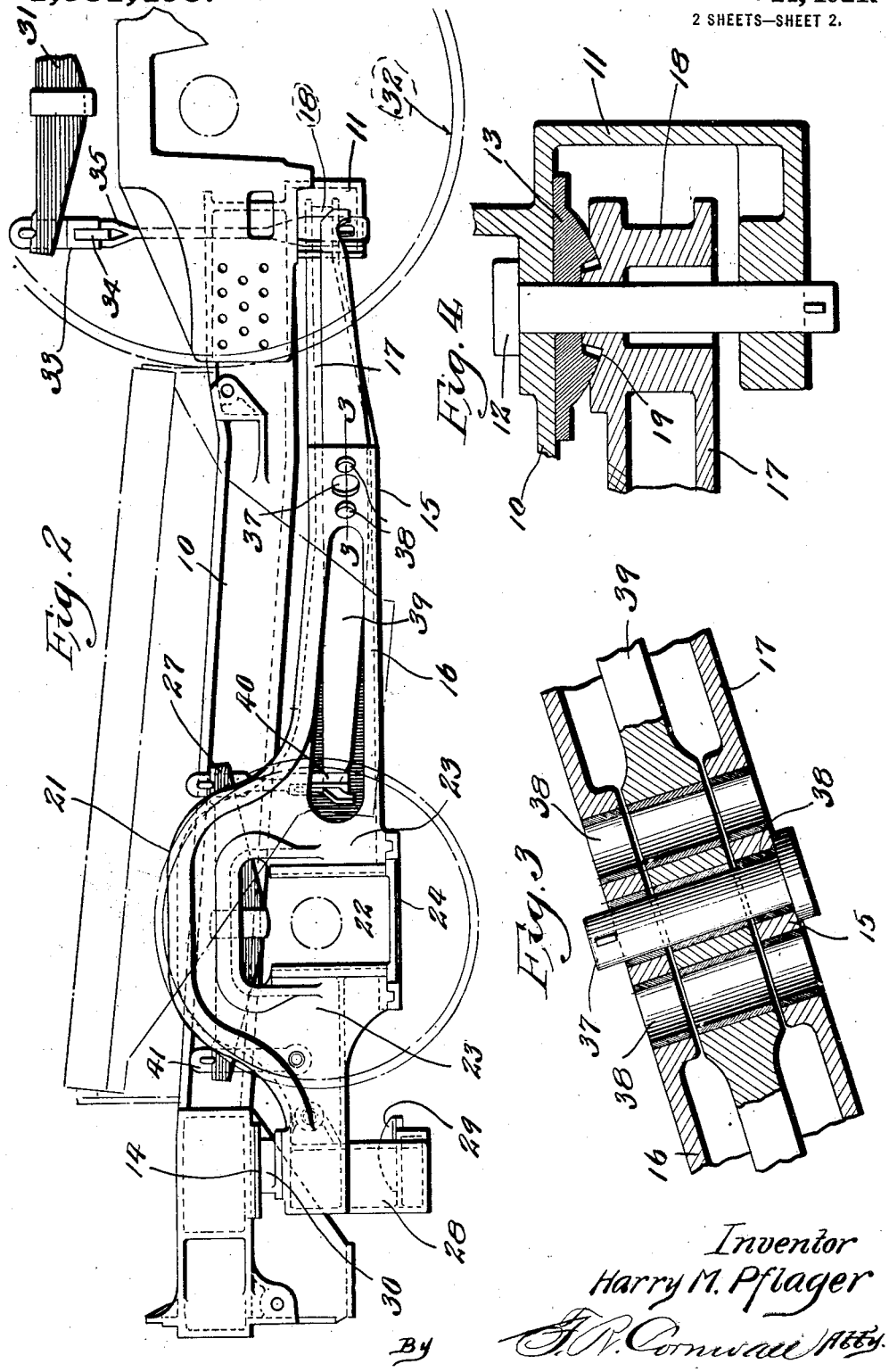

HARRY M. PFLAGER, OF ST. LOUIS, MISSOURI, ASSIGNOR TO COMMONWEALTH STEEL COMPANY, OF ST. LOUIS, MISSOURI, A CORPORATION OF NEW JERSEY.

LOCOMOTIVE TRAILER-TRUCK.

1,381,498.   Specification of Letters Patent.   Patented June 14, 1921.

Application filed October 6, 1920. Serial No. 414,981.

*To all whom it may concern:*

Be it known that I, HARRY M. PFLAGER, a citizen of the United States, residing at St. Louis, Missouri, have invented a certain new and useful Improvement in Locomotive Trailer-Trucks, of which the following is a full, clear, and exact description, such as will enable others skilled in the art to which it appertains to make and use the same, reference being had to the acompanying drawings, forming part of this specification.

My invention relates generally to locomotives and more particularly to the trailer trucks thereof, the principal objects of my invention being to generally improve upon and simplify the construction of the existing and generally used types of locomotive trailer trucks; to provide a construction wherein the load carried by said trailer truck frame is applied at a single point adjacent to its front end and at two points to the rear of its axle, said frame being supported by the rear ends of the trailer truck springs and by equalizers that are fulcrumed on said frame, said equalizers in turn being supported by the forward ends of the trailer truck springs and by the rear driver springs of the locomotive; further, to provide a strong durable structure which has great flexibility and at the same time being constructed and arranged so as to equalize the weight of the supported load and likewise equalize and absorb strains, stresses, and vibration which may be developed while the truck is in service.

With the foregoing and other objects in view, my invention consists in certain novel features of construction and arrangement of parts, hereinafter more fully described and claimed, and illustrated in the accompanying drawings, in which—

Figure 1 is a top plan view of a trailer truck of my improved construction, and showing the same associated with a part of the main frame of the locomotive.

Fig. 2 is a side elevational view of my improved trailer truck, and showing the same in position beneath the rear portion of the main frame of the locomotive.

Fig. 3 is an enlarged horizontal section taken approximately on the line 3—3 of Fig. 2.

Fig. 4 is an enlarged detail section taken approximately on the line 4—4 of Fig. 1.

Referring by numerals to the accompanying drawings, which illustrate a practical embodiment of my invention, 10, 10 designate the side members of the rear frame or cradle of the locomotive or that portion of the frame to the rear of the main drivers, and formed integral with the forward ends of these members 10 is a transversely disposed substantially box-shaped structure 11 open at its rear end for the accommodation of the forward end of the frame of my improved trailer truck, and the latter being pivotally connected to the box-shaped member by means of a vertically disposed king pin 12. This pin passes through suitable openings formed in the top and bottom plates of member 11 and through a convex bearing plate 13, the latter being located against the under side of the top plate of said box-shaped member 11.

Formed integral with the rear portions of the rear frame members 10 are laterally projecting brackets 10$^a$ and arranged on the under sides thereof are bearing plates 14 having substantially flat smooth undersurfaces.

The frame of the trailer truck contemplated by my invention is preferably formed in a single piece by casting, although it may be of built-up or fabricated structure and the forward portion of said frame comprises a pair of side members 15 that converge toward their forward ends, the rear portions 16 of said converging side members being substantially hollow or of boxlike structure. The forward portions 17 of these converging side members are preferably of I-beam shape in cross section and their forward ends are united to form a horizontally disposed head or bearing 18 through which passes the king pin 12 and the upper surface of said head being provided with a concave bearing surface 19 that receives the convex undersurface of bearing plate 13. (See Fig. 4).

Formed integral with the converging side members 15 and arranged between the forward ends of tubular portions 16 and the rear ends of forward portions 17 is a transversely disposed rail 20 that is substantially of I-beam shape in cross section. The rear portions 21 of the side members of the trailer truck frame or those portions to the rear of the converging side rails 15 are disposed parallel with each other and substantially parallel with the side rails 10 of the rear frame of the locomotive. These rear portions 21 are substantially of inverted U-shape in order to provide an opening 22 for the accommodation of the journal boxes which receive the ends of the trailer truck axle A and the legs of said inverted U-shaped portions constitute the pedestal jaws 23 to the sides of said openings 22.

Suitable tie plates such as 24 connect the lower portions of the pedestal jaws 23 and span the journal box openings 22. The upper portions of the inverted U-shaped members 21 are bifurcated or slotted lengthwise to form longitudinally disposed openings 25 and which latter accommodate semi-elliptic leaf springs 27, the central portions of which bear on top of the trailer truck journal boxes.

The rear ends of the inverted U-shaped portions 21 of the side members of the trailer truck frame are connected by an integrally formed transversely disposed rail 28, the central portion of which is depressed with respect to its end portions, said depressed central portion being provided with a bearing, preferably a friction pad 29, which may be utilized as a support for a booster motor or booster motor supporting frame (not shown) that is associated with the trailer truck.

Suitable bearings 30, such as blocks, plates, rollers, or rockers are arranged on the end portions of the transversely disposed rail or beam 28 and the upper surfaces of which bearing members engage the under flat surfaces of bearing plates 14, and which latter are positioned on the side rails 10 of the locomotive frame.

By virtue of this construction, the load carried by the rear portion of the locomotive frame has bearing on the trailer truck frame at two points to the rear of the trailer truck axle, and at a single point at the forward end of said trailer truck frame or at the point where bearing plate 13 engages on the head or bearing member 18.

The main equalizing system of the locomotive includes semi-elliptic leaf springs such as 31 that are supported upon the journal boxes of the rear driving wheels 32, and supported by means of suitable links 33 that depend from the rear ends of these springs 31 is a cross bar or equalizer 34, from the end portions of which depend hangers 35, the lower ends of the latter extending through suitable openings 36 that are formed in the box-shaped structure 11 and said lower ends terminating at points to the sides of head or bearing 17 on the forward end of the trailer truck frame.

Fulcrumed upon horizontally disposed pins 37 that are adjustably seated in suitably arranged pairs of apertures 38 and which latter are formed in the side walls of the box-shaped members 16 and near the forward ends of the latter are rigid equalizing members 39. The forward portions of these eqalizing members lie alongside of the I-beam shaped portions 17 of the side members and the forward ends of said equalizing members are connected in a suitable manner to the lower ends of the hangers 35. The rear portions of these equalizing members occupy the substantially box-shaped portions 16 of the side rails of the trailer truck frame and the rear ends of said equalizing members are connected in a suitable manner to the lower ends of hangers 40 that depend from the forward ends of the trailer truck springs 27. Depending from the rear ends of these trailer truck springs 27 are relatively short hangers 41, the lower ends of which are pivotally connected to the trailer truck frame to the rear of the journal box openings 22.

Thus, in addition to having the load carried by the locomotive frame applied at a single point near the front end of the trailer truck frame and at two points near its rear end, said trailer truck is yieldingly supported by the rear ends of the trailer truck springs and by equalizers that are fulcrumed on the forward portions of said trailer truck frame, the rear ends of which equalizers are yieldingly supported by the forward ends of the trailer truck springs and their forward ends being connected to and yieldingly supported by the rear ends of the rear driver springs of the locomotive.

Thus the trailer truck frame through its connections with the rear driver springs and the trailer truck springs becomes a part of the main equalizing system of the locomotive, and in the event that the equalizers 39 that are fulcrumed on the side members of the trailer truck frame shift upon their fulcrums so that their rear ends move downward, the connections between the rear ends of said equalizers and the trailer truck springs 27 will tend to move the rear ends of the latter upwardly, thereby tending to move the rear end of the trailer truck frame in an upward direction, but such movement will be resisted by the locomotive frame which bears at two points on the rear end of said trailer truck frame.

It will be understood that the wheels carried by the trailer truck axle A are located immediately adjacent to the inverted U-shaped portions 21 of the trailer truck side members, and in order to provide ample room for said wheels during the lateral swing of the trailer truck frame, the adjacent portions of the locomotive frame may be made narrower as illustrated in Fig. 1.

The fulcrum for the equalizers 39 may be readily shifted or changed to suit different conditions and requirements by proper manipulation of pins 37 in the pairs of apertures 38 and to increase the range of adjustment of these fulcrums, a plurality of pin receiving apertures may be formed in the central portions of said equalizing members. (See Fig. 3).

A trailer truck frame of my improved construction is comparatively simple, is capable of being easily and cheaply produced, is very strong and durable, relatively light in weight, provides a firm, substantial and yet flexible support for the rear portion of the locomotive frame, combines with the main equalizing system of the locomotive to effect a proper distribution of the weight of supported loads and stresses produced while in service, and is very effective in performing its intended functions.

It will be readily understood that minor changes in the size, form and construction of the various parts of my improved locomotive trailer truck can be made and substituted for those herein shown and described, without departing from the spirit of my invention, the scope of which is set forth in the appended claims.

I claim as my invention:

1. A locomotive trailer truck including a truck frame and a wheel carrying axle, means for supporting the truck frame upon said axle, which supporting means is located in front and to the rear of said axle, that portion of the supporting means in front of the axle including equalizers that are fulcrumed on the trailer truck frame and which forms part of the main equalizing system, and said trailer truck frame being adapted to receive its load at a point near its forward end in front of the fulcrum points of the equalizers and at points to the rear of said axle.

2. A locomotive trailer truck including a frame and a wheel carrying axle, which frame is adapted to receive the weight and load of the locomotive frame at a single point near its forward end and at a plurality of points to the rear of the axle, and means for yieldingly supporting the trailer truck frame upon its axle, which means includes springs supported by the trailer truck axle, journal boxes, and equalizing members that are fulcrumed on the trailer truck frame in front of the axle thereof and which forms part of the main equalizing system.

3. A locomotive trailer truck including a frame and a wheel carrying axle, which frame is adapted to receive the weight and load of the locomotive frame at a single point near its forward end and at a plurality of points to the rear of the axle, and means for yieldingly supporting the trailer truck frame upon its axle, which means includes springs supported by the trailer truck axle journal boxes, and equalizing members that are fulcrumed on the trailer truck in front of the axle thereof and the forward ends of said equalizing members being connected to the main equalizing system of the locomotive.

4. The combination with a locomotive frame, of a trailer truck frame pivotally connected to said locomotive frame, a wheel carrying axle journaled in said trailer truck frame, said trailer truck frame being provided near its forward end and to the rear of the axle with bearings for the locomotive frame, springs supported by the trailer truck axle, connections between the rear ends of said springs and the trailer truck frame, equalizing members fulcrumed on the trailer truck frame in front of its axle, and connections from the forward ends of the trailer truck springs to the rear ends of said equalizing members, said equalizing members forming part of the main equalizing system.

5. The combination with a locomotive frame, of a trailer truck frame pivotally connected to said locomotive frame, a wheel carrying axle journaled in said trailer truck frame, said trailer truck frame being provided near its forward end and to the rear of the axle with bearings for the locomotive frame, springs supported by the trailer truck axle, connections between the rear ends of said springs and the trailer truck frame, equalizing members fulcrumed on the trailer truck frame in front of its axle, connections from the forward ends of the trailer truck springs to the rear ends of said equalizing members, and connections from the forward ends of said equalizing members to the main equalizing system of the locomotive.

6. The combination with a locomotive main frame, of a trailer truck pivotally connected to and arranged beneath the rear portion of said locomotive frame, said trailer truck including a frame and a wheel carrying axle, said trailer truck frame being provided adjacent to its forward end and to the rear of said axle with bearings for the locomotive frame, means for yieldingly supporting the trailer truck frame upon its axle, the points of connection between said supporting means and the trailer truck frame being located between the trailer truck axle and the front and rear bearings for the locomotive frame, said supporting means including equalizing members that are fulcrumed upon the trailer truck frame, and the forward ends of said equalizing members being flexibly connected to the main equalizing system of the locomotive.

7. The combination with a locomotive frame, of a wheel carrying trailer truck frame arranged beneath and pivotally connected to the locomotive frame and adapted to support the latter, springs supported by the wheel carrying axle of the trailer truck frame, connections between the rear ends of said springs and said trailer truck frame, equalizing members fulcrumed at about their centers on the trailer truck frame in front of the wheel carrying axle, the rear ends of which equalizing members are connected to the forward ends of the trailer truck supporting springs, and the forward ends of said equalizing members being flexibly connected to the main equalizing system of the locomotive.

8. The combination with a locomotive frame, of a wheel carrying trailer truck frame arranged beneath and pivotally connected to the locomotive frame and adapted to support the latter, springs supported by the wheel carrying axle of the trailer truck frame, connections between the rear ends of said springs and said trailer truck frame, equalizing members having adjustable fulcrums at about their centers upon said truck frame in front of the wheel carrying axle associated therewith, the rear ends of which equalizing members are connected to the forward ends of the trailer truck springs, and the forward ends of said equalizing members being connected to the main equalizing system of the locomotive.

In testimony whereof I hereunto affix my signature this 24th day of September, 1920.

HARRY M. PFLAGER.